(12) United States Patent
Guerrero (10) Patent No.: US 8,917,931 B2
(45) Date of Patent: Dec. 23, 2014

(54) COLOR CONVERSION BASED ON AN HVS MODEL

(71) Applicant: Eye IO, LLC, Palo Alto, CA (US)

(72) Inventor: Rodolfo Vargas Guerrero, Palo Alto, CA (US)

(73) Assignee: Eye IO, LLC, Palo Alto, CA (US)

( * ) Notice: Subject to any disclaimer, the term of this patent is extended or adjusted under 35 U.S.C. 154(b) by 0 days.

(21) Appl. No.: 14/085,679

(22) Filed: Nov. 20, 2013

(65) Prior Publication Data

US 2014/0233658 A1    Aug. 21, 2014

Related U.S. Application Data

(63) Continuation of application No. 13/357,579, filed on Jan. 24, 2012, now Pat. No. 8,611,653.

(60) Provisional application No. 61/437,234, filed on Jan. 28, 2011.

(51) Int. Cl.
 *G06K 9/36* (2006.01)
 *H04N 19/46* (2014.01)

(52) U.S. Cl.
 CPC .............................. *H04N 19/00545* (2013.01)
 USPC ........... 382/166; 382/162; 382/239; 382/241; 382/251

(58) Field of Classification Search
 CPC ....... G06T 9/005; G06T 11/001; G06T 7/408; G06T 5/001; H04N 1/64; H04N 7/26148; H04N 7/26292; H04N 7/30; H04N 1/6058; H04N 9/045
 USPC ................. 382/166, 162, 239, 241, 251, 305; 345/502, 519; 375/E7.137, 240.02; 455/556.1; 709/231, 234; 370/338; 380/210, 240; 725/116, 98, 114, 105
 See application file for complete search history.

(56) References Cited

U.S. PATENT DOCUMENTS

| | | | |
|---|---|---|---|
| 5,463,702 | A | 10/1995 | Trueblood |
| 5,742,796 | A | 4/1998 | Huxley |
| 7,072,521 | B1 | 7/2006 | Cadwell |
| 7,099,389 | B1 | 8/2006 | Yu et al. |
| 7,657,110 | B2 | 2/2010 | Feng et al. |
| 8,285,037 | B2 | 10/2012 | Speirs et al. |

(Continued)

FOREIGN PATENT DOCUMENTS

| | | |
|---|---|---|
| EP | 0555835 | 8/1993 |
| JP | 05328142 A | 12/1993 |
| JP | 11112817 A | 4/1999 |

OTHER PUBLICATIONS

International Search Report and Written Opinion of International Application No. PCT/US2012/022442, Aug. 27, 2012, 8 pages.

(Continued)

*Primary Examiner* — Anh Do
(74) *Attorney, Agent, or Firm* — Perkins Coie LLP (57) ABSTRACT

An encoder for encoding a video stream or an image is described herein. The encoder receives an input video stream and outputs an encoded video stream that can be decoded at a decoder to recover, at least approximately, an instance of the input video stream. The encoder includes an encoding logic reducing a color spectral resolution of the input video stream to a range of colors or color differentials similar to that recognizable by a human eye, whereby an encoding efficiency is increased by the color spectral resolution reducing.

18 Claims, 6 Drawing Sheets

(56) References Cited

U.S. PATENT DOCUMENTS

| | | | |
|---|---|---|---|
| 2001/0017887 | A1 | 8/2001 | Furukawa et al. |
| 2002/0024999 | A1 | 2/2002 | Yamaguchi et al. |
| 2005/0094870 | A1 | 5/2005 | Furukawa et al. |
| 2007/0206674 | A1 | 9/2007 | Ziauddin et al. |
| 2010/0189183 | A1 | 7/2010 | Gu et al. |
| 2011/0002382 | A1 | 1/2011 | Takimoto et al. |

OTHER PUBLICATIONS

International Search Report and Written Opinion of International Application No. PCT/US2012/022710, Sep. 3, 2012, 9 pages.

International Search Report and Written Opinion of International Application No. PCT/US2012/022720, Sep. 7, 2012, 7 pages.

Non-Final Office Action mailed Feb. 20, 2014 in Co-Pending U.S. Appl. No. 14/085,679, filed Jan. 26, 2012.

Non-Final Office Action mailed Jul. 23, 2013 in Co-Pending U.S. Appl. No. 13/357,579 of Guerrero, R.D. filed Jan. 24, 2012.

Notice of Allowance mailed Oct. 11, 2013, in Co-Pending U.S. Appl. No. 13/357,579 of Guerrero, R.D. filed Jan. 24, 2012.

U.S. Appl. No. 13/358,877 of Guerrero, RV., filed Jan. 26, 2012.

U.S. Appl. No. 13/359,435 of Guerrero, R.V., filed Jan. 26, 2012.

U.S. Appl. No. 13/357,579 of Guerrero, R.V., filed Jan. 24, 2012.

Extended European Search Report mailed Jun. 16, 2014, for European Patent Application No. EP 12 73 8985, pp. 1-6.

| Color Value (RGB) | Associated Core Color Value |
|---|---|
| 000 | 000 |
| 001 | 001 |
| 002 | 001 |
| 010 | 010 |
| 011 | 001 |
| 012 | 001 |
| 020 | 010 |
| 021 | 010 |
| 022 | 010 |
| 100 | 100 |
| 101 | 100 |
| 102 | 001 |
| 110 | 100 |
| 111 | 222 |
| 112 | 001 |
| 120 | 010 |
| 121 | 010 |
| 122 | 001 |
| 200 | 200 |
| 201 | 200 |
| 202 | 001 |
| 210 | 100 |
| 211 | 100 |
| 212 | 100 |
| 220 | 010 |
| 221 | 010 |
| 222 | 222 |

COLOR CONVERSION BASED ON AN HVS MODEL

PRIORITY CLAIM

This application is a continuation of U.S. patent application Ser. No. 13/357,579 entitled "Color Conversion Based on an HVS Model" and filed on Jan. 24, 2012, now U.S. Pat. No. 8,611,653, which claims priority to U.S. Provisional Patent Application No. 61/437,234 entitled "Color Conversion Based on a HVS Model in a Video Compression Process" and filed on Jan. 28, 2011. The contents of both applications are expressly incorporated by reference herein.

FIELD OF THE INVENTION

The present invention relates to a video and image compression technique and more particularly, to a video and image compression technique using color conversion based on a human vision system ("HVS") model.

BACKGROUND

With the widespread demand of video streaming, some of the limitations have to be overcome. For example, users often want to watch a video over the Internet having only a limited bandwidth for obtaining that video stream. For example, users might want to obtain the video stream over a mobile telephone connection or a home wireless connection. The lack of bandwidth can be compensated for by sping time downloading content to local storage so that, even with a very slow link, a large video stream can be obtained and stored locally for eventual play-out, if enough time is provided for the downloading. This is fine if the server or other provider of the video stream is provided advance notice of a request for the stream and can get enough of it to the local storage before the user starts to watch the video stream. Unfortunately, this is not an acceptable solution in many cases, because users often expect to start watching a video stream shortly after having decided what to watch.

A video stream (typically containing an image portion and an audio portion) can require considerable bandwidth, especially at high resolution, such as HD videos. Audio typically requires much less bandwidth, but still sometimes needs to be taken into account. One approach for streaming video (i.e., provide it to a local content consumer, such as a display device used by a user, in sufficient time to allow the consumption to start shortly after starting a session wherein a particular stream is requested) is to heavily compress the video stream. Typically, lossy compression (i.e., compression that is not entirely reversible) provides more compression than lossless compression, but heavy lossy compression provides an undesirable user experience.

What is needed for video compression is to be able to reduce the number of bits required to represent a sequence of images without creating too many undesirable artifacts and to keep the perceived video quality as constant is possible. One simple approach of compression is to compress one frame and represent each subsequent frame by a difference frame representing the pixel-by-pixel difference between the frame being encoded and its prior frame, and compress the difference. An improvement over this is to identify scene changes in the video stream (e.g., where the camera suddenly changes from one view to another such that the difference between two frames on each side of a scene change is not as compressible as other difference frames) and encode each "group of pictures" separately.

There are various techniques to automatically identify scene changes, but often that is not enough to maximize and provide the compression needed to provide desirable user experiences given bandwidth constraints.

Human vision system ("HVS") model has been utilized to deal with biological and psychological processes in imaging processing, video processing and computer vision. The model is used to simplify the behaviors of the complex visual system of a human. The HVS model is updated as the knowledge of the true visual system improves. Some assumption about the HVS model includes visual acuity based on color and motion, resolution resolving based on motion factors, and attention modeling using face recognition.

The foregoing examples of the related art and limitations related therewith are inted to be illustrative and not exclusive. Other limitations of the related art will become apparent upon a reading of the specification and a study of the drawings.

SUMMARY

Introduced herein is an encoder for encoding a video stream or an image. The encoder receives an input video stream and outputs an encoded video stream that can be decoded at a decoder to recover, at least approximately, an instance of the input video stream. The encoder includes an encoding logic reducing the amount of image data to be compressed by weighting the color of the input video stream in a range of colors or color differentials similar to that recognizable by a human eye, whereby an encoding efficiency is increased by the color spectral resolution reducing.

In one embodiment, the encoder further comprises an input for receiving a mapping function. The mapping function maps any color value from a plurality of color values to an associated core color value from a set of core color values. A human vision system model can not recognize a difference between the color value and the associated core color value. The encoding logic identifies the core color value of each macroblock in each frame of the video stream or the image, determines the best encoding parameters for that macroblock based on a color map and compresses the macroblock using the predetermined set of parameters which are optimized for each particular color This Summary is provided to introduce a selection of concepts in a simplified form that are further described below in the Detailed Description. This Summary is not inted to identify key features or essential features of the claimed subject matter, not is it inted to be used to limit the scope of the claimed subject matter.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is inted to be interpreted in its broadest reasonable manner, even though it is being used in conjunction with a detailed description of certain specific examples of the invention. Certain terms may even be emphasized below; however, any terminology inted to be interpreted in any restricted manner will be overtly and specifically defined as such in this Detailed Description section.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

In one embodiment of the present invention, an encoder is provided to receive an input video stream and output an encoded video stream that can be decoded at a decoder to recover, at least approximately, an instance of the input video stream. The encoder comprises: an input for receiving a data structure representing a model of human vision system; and an encoding logic that compresses the input video stream based on the colors, locations of pixels, and color variations between nearby pixels by mapping colors of pixels in the input video stream to a color palette having fewer core colors than the pixels of the video stream wherein the color palette is derived from the data structure representing a model of human vision.

In this manner, effective resolution of the video is reduced without compromising the human visual perception, based on an HVS model, prior to video stream being further encoded.

Figure 1:
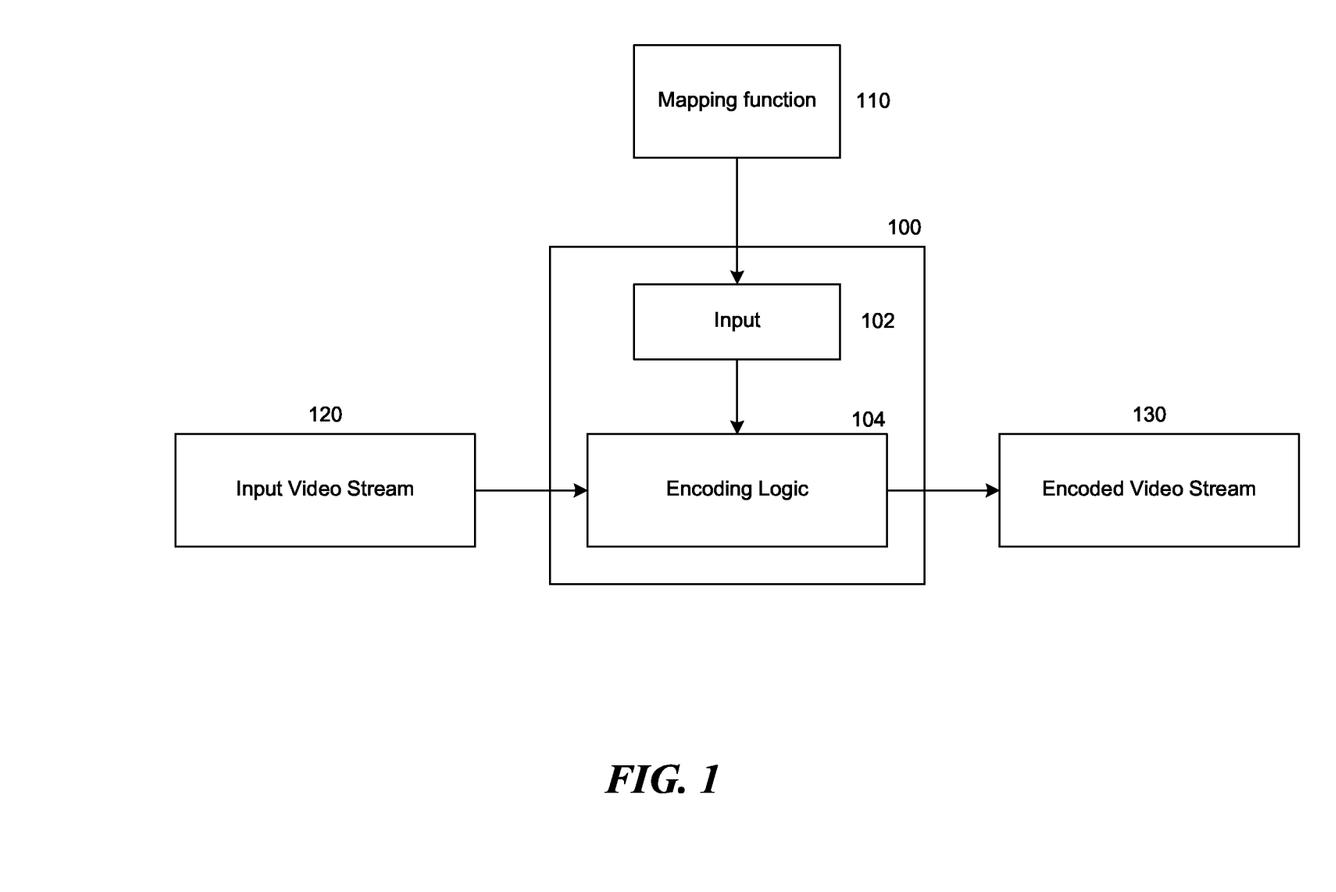
FIG. 1 illustrates an example of an encoder.

FIG. 1 illustrates an example of an encoder, according to one embodiment of the present invention. The encoder 100 receives an input video stream 120 and outputs an encoded video stream 130 that can be decoded at a decoder to recover, at least approximately, an instance of the input video stream. The encoder 100 comprises an input 102 for receiving a mapping function 110 and an encoding logic 104. The mapping function 110 maps any color value from a plurality of color values to an associated core color value from a set of core color values. A human vision system ("HVS") model can not recognize the encoding difference between the conventional encoding process and the one considering the associated core color value settings.

The encoding logic reduces the spectral resolution to be encoded of each macroblock within the input video stream base on the HVS model. Some macroblocks get reduced more than others in the same way that a human eye can perceive the amount of detail at each color, whereby an encoding efficiency is increased by the color spectral resolution perception. Color discrete resolution (also referred to as color depth) is the number possible colors in an image or a video stream. In one embodiment, the encoding logic identifies a color value of each macroblock in each frame of the input video stream, determines whether the color value of the macroblock in the set of core color values, and quantifies the macroblock based on the mapping function 110.

In another embodiment the energy of the macroblock is measured and replaced by another texture with similar "visual energy" but with less bits to be encoded.

In one embodiment, the color value of the macroblock is identified by averaging the color values of all pixels within the macroblock (DC).

Figure 2:
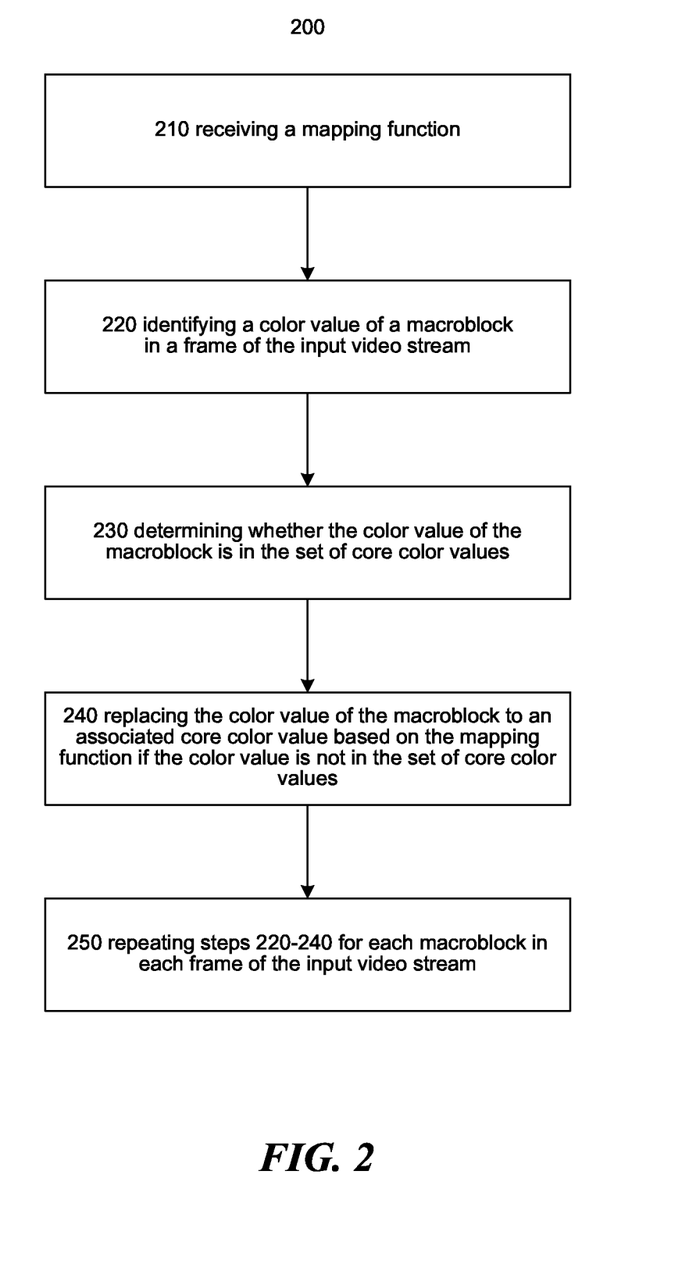
FIG. 2 illustrates steps of a sample method for encoding an input video stream.

FIG. 2 illustrates steps of a method 200 for encoding an input video stream. The method encodes the input video stream to an encoded video stream that can be decoded at a decoder to recover, at least approximately, an instance of the input video stream. First step 210 is receiving a mapping function, wherein the mapping function maps any color value from a plurality of color values to an associated core color value from a set of core color values, and a human vision system model can not recognize a difference between the color value and the associated core color value. Next step 220 is identifying a color value of the Macroblock DC in a frame of the input video stream. Then there is a step 230 of determining whether the color value of the Macroblock DC is in the set of core color values. Next step 240 is replacing the color value of the Macroblock DC to an associated core color value based on the mapping function if the color value is not in the set of core color values. At 250, the steps 220-240 are repeated for each pixel in each frame of the input video stream.

The dimension of the macroblock may vary. Any reasonable size within the video frame may be utilized, as appreciated by an ordinary skilled person in the art. In one embodiment, the dimension of the macroblock is 16 pixels by 16 pixels. In another embodiment, the dimension of the macroblock is 1 pixel by 1 pixel, which means each pixel is treated as a macroblock in the embodiment.

In one embodiment, colors are treated differently in the mapping function. For example, red areas may draw more attentions from a human vision system model than blue areas. Accordingly, the mapping function may allocate more image quality to areas where the attention is higher. In another embodiment the video quality can be decreased to areas with less attention and progressively increase or redirect the image quality to those areas in the same way that humans inspect such image. In another embodiment attention can be measured by core color value where per example reds have a chance to get more initial attention than greens and blues.

Figure 3:
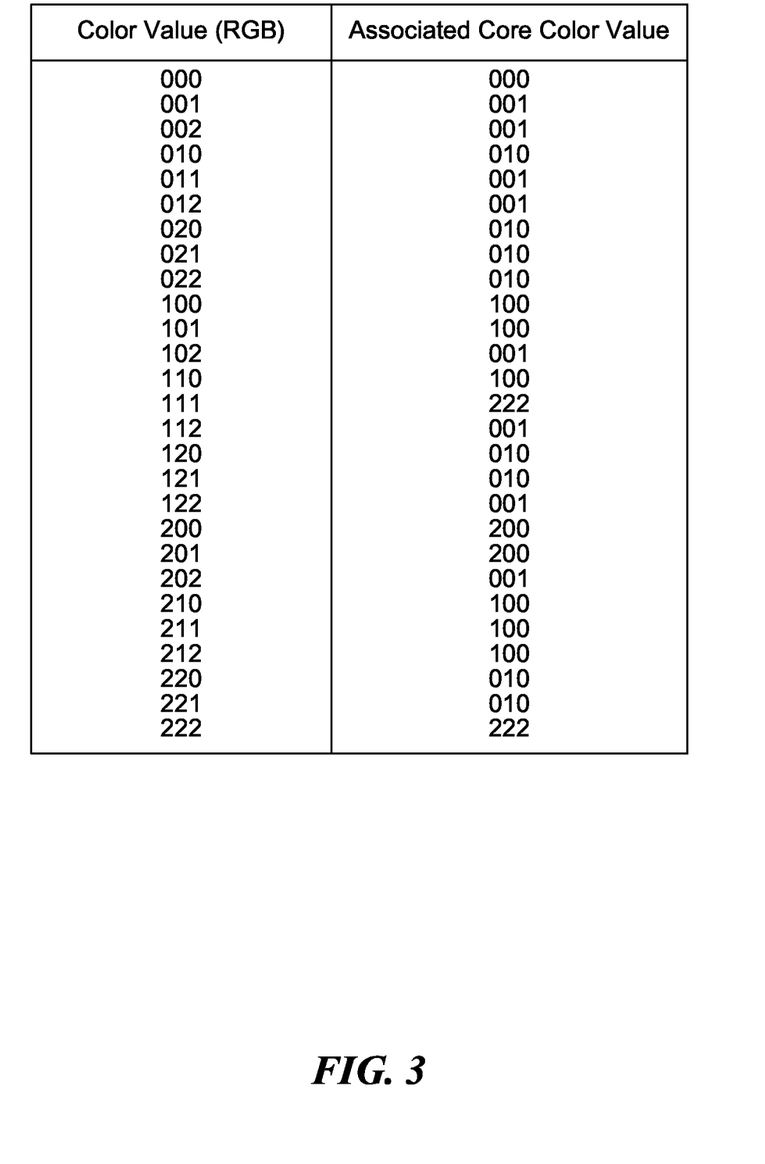
FIG. 3 illustrates a table as an example of a mapping function.

FIG. 3 illustrates a table as an example of a mapping function, according to one embodiment of the present invention. In this simplified example, all possible color values are listed in the left column as ternary RGB values. Each color value of ternary RGB value is mapped to an associated core color value. The set of core color value includes 000, 001, 010, 100, 200, and 222. The total number of core color values is smaller than the number of possible color values. In each row of the table, a human vision system model can not recognize a perceptible difference between the color value and its associated core color value. Therefore, the color values are replaced with the associated core color values according to the mapping function shown in the table of FIG. 3, without compromising the visual perception of the video. In other embodiments, the mapping function may be in a form of table, formula, list, function, or computer executable instruction.

Figure 4:
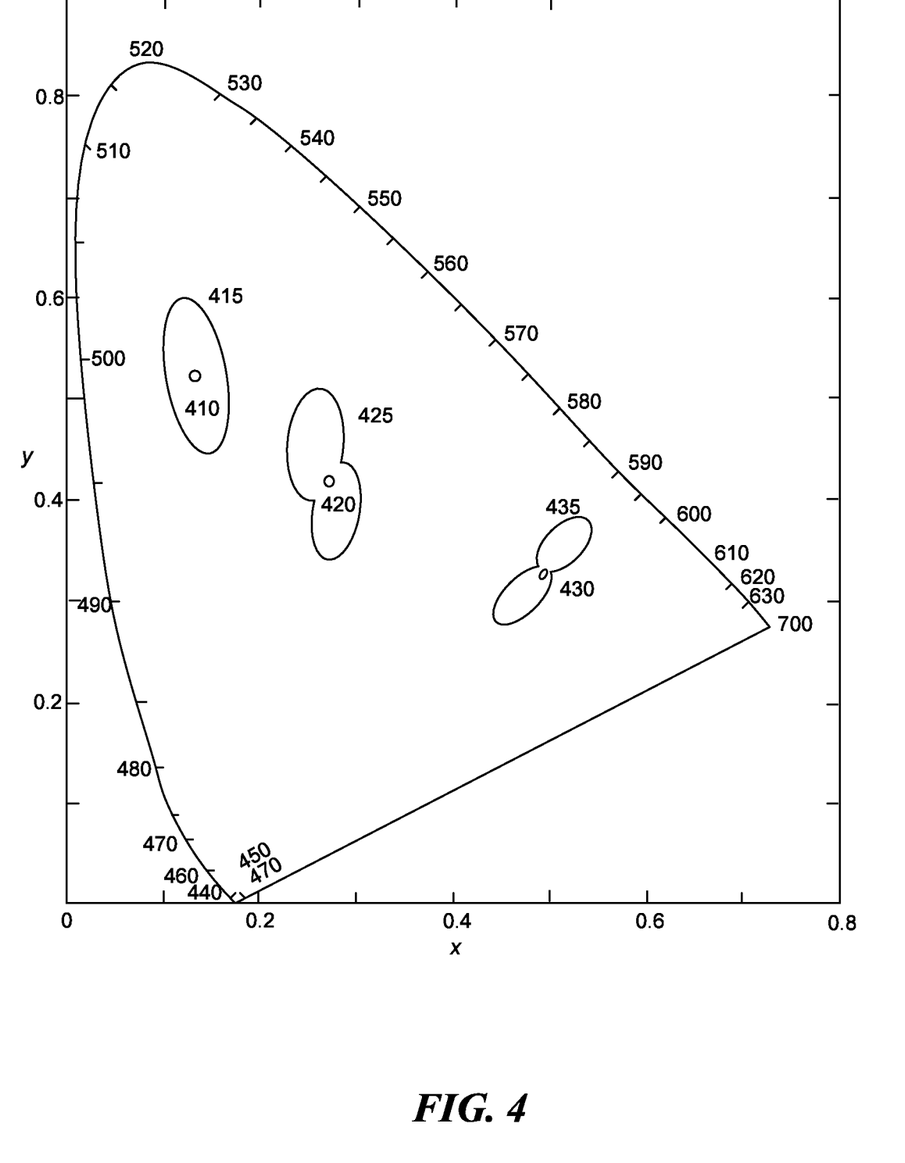
FIG. 4 illustrates part of a mapping function on a CIE color space chromaticity diagram.

FIG. 4 illustrates part of a mapping function on a CIE color space chromaticity diagram, according to one embodiment of the present invention. The points 410, 420, 430 represents three core color values included in a set of core color values. All color values represented by area 415 are mapped to the associated core color values represented by point 410. All color values represented by areas 425 are mapped to the associated core color values represented by point 420. All color values represented by area 435 are mapped to the associated core color values represented by point 430. A human vision system model can not recognize a perceptible difference between the color value within each area (415, 425, 435). Therefore the number of color values can be significantly reduced by mapping the color values to a set of core values based on a mapping function. In one embodiment, the set of core color values corresponds to a subspace of the CIE XYZ color space, while all color values are mapped to the core color values in the subspace.

The techniques disclosed herein can also be applied to image encoding. In one embodiment, there is a method of encoding an input image to an encoded image that can be decoded at a decoder to recover, at least approximately, an instance of the input image. The method comprising steps of: (a) receiving a mapping function, wherein the mapping function maps any color value from a plurality of color values to an associated core color value from a set of core color values, and a human vision system model can not recognize a difference between the color value and the associated core color value; (b) identifying a color value of a macroblock in the image; (c) determining whether the color value of the macroblock is in the set of core color values; (d) replacing the color value of the macroblock to an associated core color value based on the mapping function if the color value is not in the set of core color values; and (e) repeating steps (b)-(d) for each macroblock in the image.

Figure 5:
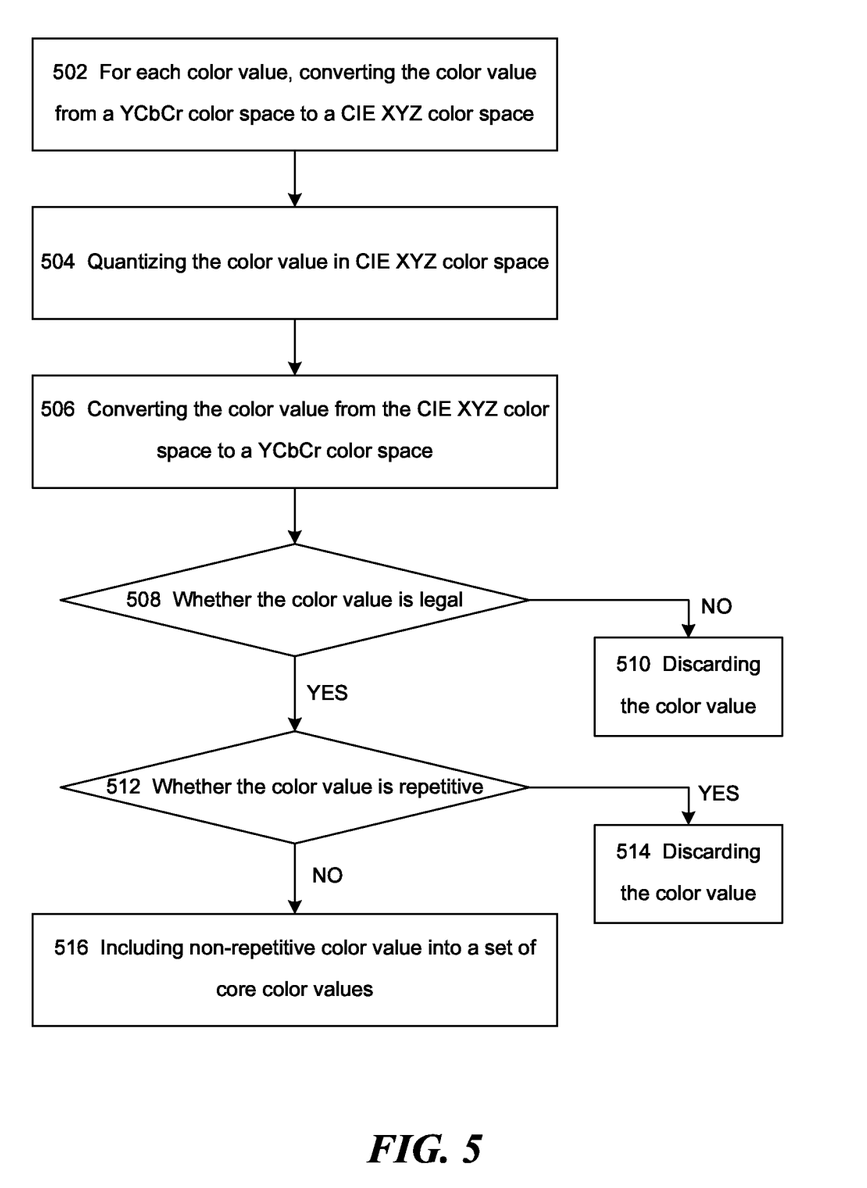
FIG. 5 illustrates steps of a sample method for determining a set of core color values based on a human vision system model.

The set of core color values may be determined by a human vision system model, for example, as illustrated in FIG. 5. At 502, for each color value [L,Cb,Cr] in YCbCr color space, wherein L may be from 16 to 236, Cb and Cr may be from 16 to 240, color value [L,Cb,Cr] is first converted to a color value [R,G,B] in a RGB color space, such as sRGB color space. In one embodiment, the conversion is determined by formulas:

$$R=L+(1.371*Cr),$$

$$G=L-(0.698*Cr)-(0.336*Cb)$$

$$B=L+(1.732*Cb).$$

In some embodiments, the color value may be normalized to [0,1] range, and color values outside of the range is discarded. The color value [R,G,B] is further converted to a color value [X,Y,Z] in a CIE XYZ color space. In one embodiment, the conversion is determined by formulas:

$$X=(0.412*R)+(0.357*G)+(0.180*B),$$

$$Y=(0.213*R)+(0.715*G)+(0.072*B),$$

$$Z=(0.019*R)+(0.119*G)+(0.950*B).$$

In some embodiments, the color value may be normalized to [0,1] range, and color values outside of the range is discarded. The color value [X,Y,Z] is quantized at the CIE XYZ color space at step 504. Therefore, the number of discrete colors is reduced. In one embodiment, the quantization of [X,Y,Z] is based on formulas:

$$X'=\text{Round}(X/Q)*Q,$$

$$Y'=\text{Round}(X/Q)*Q,$$

$$X'=\text{Round}(X/Q)*Q;$$

wherein the quantization factor Q=2.8/255, in this embodiment. At 506, the quantized color value [X',Y',Z'] is converted back to RGB color space. In one embodiment, the conversion is determined by formulas:

$$R'=(3.240*X')-(1.537*Y')-(0.499*Z'),$$

$$G'=(-0.969*X')+(1.876*Y')+(0.042*Z'),$$

$$B'=(0.056*X')-(0.204*Y')+(1.057*Z').$$

In some embodiments, the color value may be normalized to [0,1] range, and color values outside of the range is discarded. The converted color value [R',G',B'] is further converted back to YCbCr color space. In one embodiment, the conversion is determined by formulas:

$$L'=\text{Round}((0.299*R)+(0.587*G)+(0.114*B)),$$

$$Cb'=\text{Round}((-0.172*R)-(0.339*G)+(0.511*B)+128),$$

$$Cr'=\text{Round}((0.511*R)-(0.428*G)-(0.083*B)+128).$$

At 508, the converted color value [L',Cb',Cr'] is legalized, which means that any color value is determined whether L' is outside of [16,236] or Cb'/Cr' is outside of [16,240]. If the color value is illegal, i.e. L'/Cb'/Cr' is out of legal ranges, the color value is discarded (510). At 512, color value is determined whether it is repetitive, i.e. a color value already included in the set of core color values. If not, at 516, all non-repetitive color value [L',Cb',Cr'] are included in the set of core color values. Repetitive color values are discarded since they have been already included in the set (514). The set of core color values may be stored in a memory or any storage device accessible for encoding. A human vision system model is not able to recognize a perceptible difference between a core color value within the set and a color substantially near the core color value in a color space. Therefore, any color in an image or a video stream that is not included in the set of core color values can be replaced with a closest core color value, without compromising the human visual perception.

In some other embodiments, the color values in YCbCr color space may be directly converted to XYZ color space. In some other embodiments, the set of core color value may be presented in other color space, such as RGB color space, CIE XYZ color space, CMYK color space, CIE LAB color space, YUV color space, YIQ color space, xvYCC color space, HSV color space, HSL color space, or any other color space that a ordinary skilled person in the art would readily utilize for the color values. In some other embodiments, the quantization may be conducted in other color space, such as YCbCr color space, RGB color space, CMYK color space, CIE LAB color space, YUV color space, YIQ color space, xvYCC color space, HSV color space, HSL color space, or any other color space that a ordinary skilled person in the art would readily utilize for quantization of color values. In some other embodiment, the quantization may be non-linear, which means that the quantization factor may be a function depent on the color values, instead of a constant.

Figure 6:
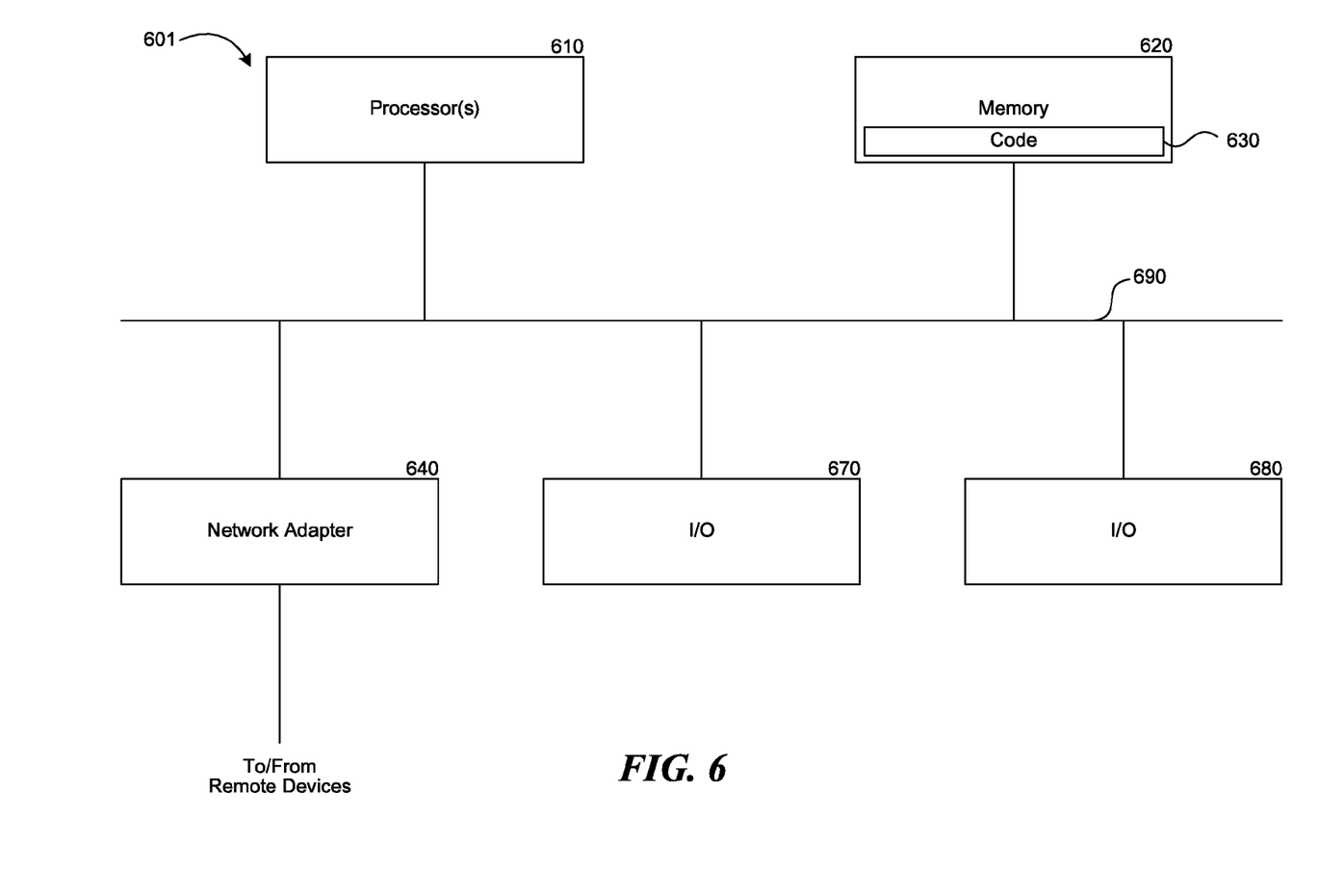
FIG. 6 is a block diagram of a processing system that can be used to implement an encoder implementing the techniques described herein.

FIG. 6 is a block diagram of a processing system that can be used to implement any of the techniques described above, such as an encoder. Note that in certain embodiments, at least some of the components illustrated in FIG. 6 may be distributed between two or more physically separate but connected computing platforms or boxes. The processing can represent a conventional server-class computer, PC, mobile communication device (e.g., smartphone), or any other known or conventional processing/communication device.

The processing system 601 shown in FIG. 6 includes one or more processors 610, i.e. a central processing unit (CPU), memory 620, at least one communication device 640 such as an Ethernet adapter and/or wireless communication subsystem (e.g., cellular, WiFi, Bluetooth or the like), and one or more I/O devices 670, 680, all coupled to each other through an interconnect 690.

The processor(s) 610 control(s) the operation of the computer system 601 and may be or include one or more programmable general-purpose or special-purpose microprocessors, microcontrollers, application specific integrated circuits (ASICs), programmable logic devices (PLDs), or a combination of such devices. The interconnect 690 can include one or more buses, direct connections and/or other types of physical connections, and may include various bridges, controllers and/or adapters such as are well-known in the art. The interconnect 690 further may include a "system bus", which may be connected through one or more adapters to one or more expansion buses, such as a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The memory 620 may be or include one or more memory devices of one or more types, such as read-only memory (ROM), random access memory (RAM), flash memory, disk drives, etc. The network adapter 640 is a device suitable for enabling the processing system 601 to communicate data with a remote processing system over a communication link, and may be, for example, a conventional telephone modem, a wireless modem, a Digital Subscriber Line (DSL) modem, a cable modem, a radio transceiver, a satellite transceiver, an Ethernet adapter, or the like. The I/O devices 670, 680 may include, for example, one or more devices such as: a pointing device such as a mouse, trackball, joystick, touchpad, or the like; a keyboard; a microphone with speech recognition interface; audio speakers; a display device; etc. Note, however, that such I/O devices may be unnecessary in a system that operates exclusively as a server and provides no direct user interface, as is the case with the server in at least some embodiments. Other variations upon the illustrated set of components can be implemented in a manner consistent with the invention.

Software and/or firmware 630 to program the processor(s) 610 to carry out actions described above may be stored in memory 620. In certain embodiments, such software or firmware may be initially provided to the computer system 601 by downloading it from a remote system through the computer system 601 (e.g., via network adapter 640).

The techniques introduced above can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

The foregoing description of various embodiments of the claimed subject matter has been provided for the purposes of illustration and description. It is not inted to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. An encoder that receives an input video stream and outputs an encoded video stream that can be decoded at a decoder to recover, at least approximately, an instance of the input video stream, the encoder comprising:
   an encoding logic configured to perform a process including
      identifying a color value in the input video stream,
      determining whether the color value is in the set of core color values defined by a mapping function, wherein the mapping function maps any color value from a plurality of color values to an associated core color value from a set of core color values, and a human vision system model cannot recognize a difference between the color value and the associated core color value, replacing the color value to an associated core color value based on the mapping function if the color value is not in the set of core color values; and an output configured to present a color spectral resolution of the input video stream having a range of colors or color differentials similar to that recognizable by a human eye, wherein an encoding efficiency is increased by the color spectral resolution reducing.

2. The encoder of claim 1, further comprising:

an input configured to receive the mapping function; and wherein the process of the encoding logic includes:
- identifying a color value of each macroblock in each frame of the input video stream,
- determining whether the color value of the macroblock is in the set of core color values, and
- replacing the color value of the macroblock to an associated core color value based on the mapping function if the color value is not in the set of core color values.

3. A method for encoding an input video stream to an encoded video stream that can be decoded at a decoder to recover, at least approximately, an instance of the input video stream, the method comprising:

receiving at an encoder the input video stream;

via logic with the encoder,
- identifying a color value in the input video stream;
- replacing the color value in the input video stream to an associated core color value based on a mapping function, wherein the mapping function maps any color value from a plurality of color values to an associated core color value from a set of core color values, and a human vision system model cannot recognize a difference between the color value and the associated core color value; and outputting from the encoder a color spectral resolution of the input video stream having a range of colors or color differentials similar to that recognizable by a human eye.

4. The method of claim 3, wherein the step of replacing comprises:
- (a) identifying a color value of a macroblock in a frame of the input video stream;
- (b) determining whether the color value of the macroblock is in the set of core color values;
- (c) replacing the color value of the macroblock to an associated core color value based on the mapping function if the color value is not in the set of core color values; and
- (d) repeating steps (a)-(c) for each macroblock in each frame of the input video stream.

5. The method of claim 4, wherein the set of core color values corresponds to a subspace of the CIE XYZ color space.

6. The method of claim 4, wherein the color value of the macroblock is identified by averaging color values of pixels within the macroblock.

7. The method of claim 4, wherein the color value of the macroblock is replaced so that pixels within the macroblock have the same color value.

8. The method of claim 4, wherein a dimension of the macroblock is 16 pixels by 16 pixels.

9. The method of claim 4, wherein a dimension of the macroblock is 1 pixel by 1 pixel.

10. The method of claim 4, wherein set of core color values contains more color values close to red than color values close to blue.

11. A computer implemented method of encoding an input image to an encoded image that can be decoded at a decoder to recover, at least approximately, an instance of the input image, the method comprising:

receiving at the encoder the input image;

via encoding logic within the encoder identifying a color value in the image;

via encoding logic within the encoder generating an output image by replacing the color value in the input image to an associated core color value based on a mapping function, wherein the mapping function maps any color value from a plurality of color values to an associated core color value from a set of core color values, and a human vision system model cannot recognize a difference between the color value and the associated core color value; and outputting from the encoder the output image having a range of colors or color differentials similar to that recognizable by a human eye.

12. The method of claim 11, wherein the step of generating the output image comprises:
- (a) identifying a color value of a macroblock in the image;
- (b) determining whether the color value of the macroblock is in the set of core color values;
- (c) replacing the color value of the macroblock to an associated core color value based on the mapping function if the color value is not in the set of core color values; and
- (d) repeating steps (a)-(c) for each macroblock in the image.

13. The method of claim 12, wherein the set of core color values corresponds to a subspace of the CIE XYZ color space.

14. The method of claim 12, wherein the color value of the macroblock is identified by averaging color values of pixels within the macroblock.

15. The method of claim 12, wherein the color value of the macroblock is replaced so that pixels within the macroblock have the same color value.

16. The method of claim 12, wherein a dimension of the macroblock is 16 pixels by 16 pixels.

17. The method of claim 12, wherein a dimension of the macroblock is 1 pixel by 1 pixel.

18. The method of claim 12, wherein set of core color values contains more color values close to red than color values close to blue.

* * * * *